United States Patent [19]
Takiguchi et al.

[11] 3,857,153
[45] Dec. 31, 1974

[54] FILM CASSETTE COVER OPENER

[75] Inventors: Sunichi Takiguchi; Yasuhiko Satoyoshi; Shinji Hamada; Takeshi Nakamura; Sadaaki Koba; Noboru Shimoda, all of Minami Ashigara, Japan

[73] Assignee: Fuji Photo Film Co., Ltd., Kanagawa, Japan

[22] Filed: Apr. 19, 1973

[21] Appl. No.: 352,818

[30] Foreign Application Priority Data
Apr. 19, 1972  Japan............................... 47-39470

[52] U.S. Cl.............................. 29/200 D, 29/200 P
[51] Int. Cl............................................ B23p 19/00
[58] Field of Search .......... 29/200 D, 200 B, 200 R, 29/200 P, 427

[56] References Cited
UNITED STATES PATENTS
3,548,478   12/1970   Blackman.......................... 29/200 D Primary Examiner—Thomas H. Eager
Attorney, Agent, or Firm—Sughrue, Rothwell, Mion & Macpeak

[57] ABSTRACT

A cover opener for use with a film cassette having cover closing means released by pushing the cover closing means from the locked to unlocked position. The opener is made of a pair of guides and at least one projection, which is adapted to be inserted into a notch or a hole formed in the foremost side of the film cassette and thereby push the cover locking means from the locked to unlocked position.

10 Claims, 6 Drawing Figures

PATENTED DEC 31 1974 3,857,153
SHEET 1 OF 2

3,857,153

FILM CASSETTE COVER OPENER

BACKGROUND OF THE INVENTION

1. Field of the Invention

This invention relates to a cover opener for a film cassette which releases a film therefrom upon charging the cassette into an automatic developing apparatus or the like.

2. Description of the Prior Art

Several different types of automatic apparatus for opening a cover of a film cassette upon charging the cassette into the automatic developing apparatus have been proposed, but such an apparatus which is simple in construction and invariably functions to open the cassette is not yet available.

SUMMARY OF THE INVENTION

One object of this invention is to provide a cover opener for a film cassette which is easy to activate and which releases the locked cover permitting removal of a film therefrom by the combination of notches or holes formed in a foremost side of the cassette with projections which engage the notches or holes and a guide member for accurately guiding the cassette so the notches or holes will accurately engage the projection.

Other objects and features of the invention will be apparent from the description below read in conjunction with the accompanying drawings in which

DETAILED DESCRIPTION OF THE INVENTION

Figure 1:
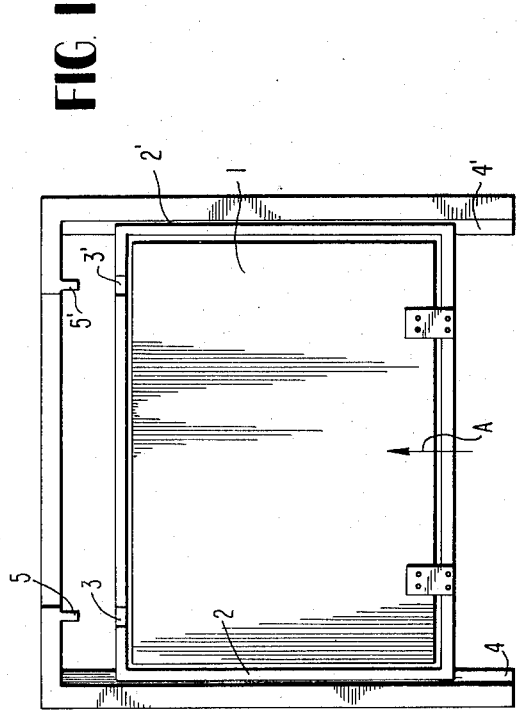
FIGS. 1 to 3 are plan views of cover openers according to the invention.
Figure 2:
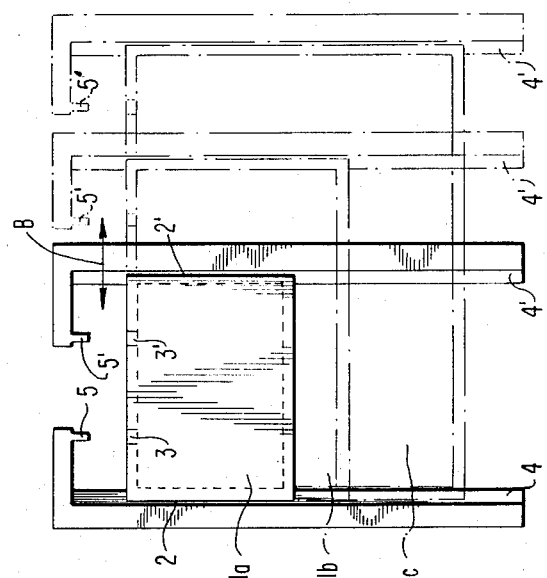
Figure 3:
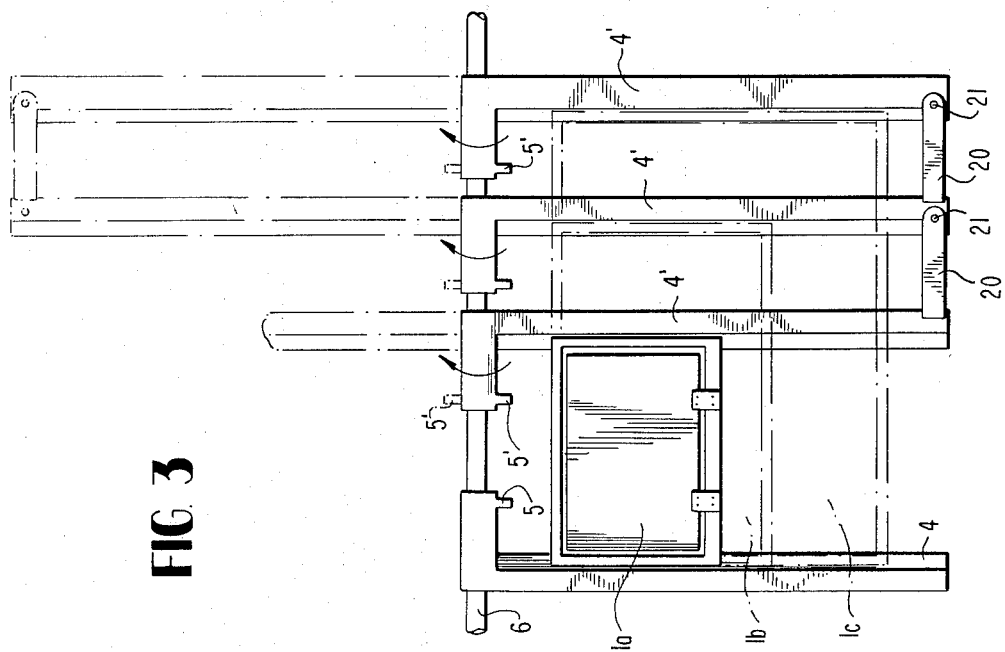

FIGS. 1 to 3 represent plan views in which film cassettes are charged into a cover opener in accordance with the invention, respectively.

In the drawings, like numerals are used to identify like elements.

Referring initially to FIG. 1, numeral 1 represents a film cassette, the foremost side of which has a pair of notches or holes 3 and 3' into which a pair of projections 5 and 5' can be inserted. Numerals 4 and 4' represent guides upon which the cassette can rest for guiding the sides 2 and 2' of the cassette 1 to control the lateral position of the cassette during the sliding movement thereof. In a perspective view, these guides would resemble a right angle, with the film cassette resting on the bottom and contacting the upwardly extending member at the film cassette side. Numerals 5 and 5' are projections integrally formed on the guides 4 and 4' and positioned in alignment with the notches or holes 3 and 3', so that upon sliding the film cassette 1 in the direction shown by arrow A the projections 5 and 5' engage with the holes or notches 3 and 3' to operate a cover opener (not shown in the figure) and open the cover of the cassette 1.

As a cover opening means, a spring is secured to the cassette which biases the cover outwardly or one can mount the film cassette in the cover opening device so that the cover of the cassette by gravity opens downwardly under the influence of gravity. Equivalents will be obvious to one skilled in the art.

FIG. 2 represents another embodiment of the invention which is used for various film cassettes as shown by the dimensions a, b and c. Notches or holes 3 and 3' are formed at a predetermined distance from both sides 2, 2' of cassettes without regard for the dimensions of the lengths of the foremost edges of the cassettes. To clarify the difference of dimensions of the casettes, one side is shown in alignment for cassette 1a, and cassettes 1b and 1c are indicated by broken lines. In these cassettes, it is, of course, necessary to provide the cover opening projections at positions which coincide with the holes or notches 3, 3'. One guide 4' is laterally movably mounted against the other frame 4 as shown by arrow B for engaging various size cassettes therebetween. The distances from the respective guides 4, 4' to projections 5 are equal to the distances between the sides 2 and 2' and the notches 3 and 3', respectively, so that by laterally moving one guide 4' to the dotted line positions, respective cassettes 1b or 1c can be engaged with the respectively positioned guides without any further adjusting means being required. The guides 4 and 4' can be joined by a laterally adjustable member which permits the two guides to be spaced apart by varying distances. The laterally adjustable member can be telescoping, can merely slide through a bracket on the guides and extend varying distances over the side, and the like.

FIG. 3 represents a further embodiment of the invention in which several guides 4' having projections 5' are rotatably mounted on a shaft 6.

Each guide 4' is positioned so as to maintain a corresponding cassette 1a, 1b or 1c between a respective guides 4' and the left most guide 4', and when one of guides 4' is used, other ones are turned to positions shown by broken lines.

Such a construction permits as easy, accurate cover opening operation with minimum placement of a cassette in an incorrect guide in a dark room.

Elements 20 are connected at one side to a guide 4' and have a hole at the opposite side to receive a pin 21 in the adjacent guide. These numbers basically act as stoppers so a smaller guide would not, for example, travel beyond the horizontal after a large cassette has been processed and one then wishes to bring a smaller guide into position for use, and in a case where a large guide is to be used the two smaller guides can be simultaneously lifted via the element 20.

Figure 4:
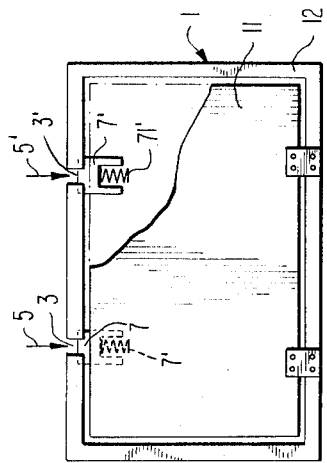
FIGS. 4 to 6 are plan views of film cassettes according to the invention.
Figure 5:
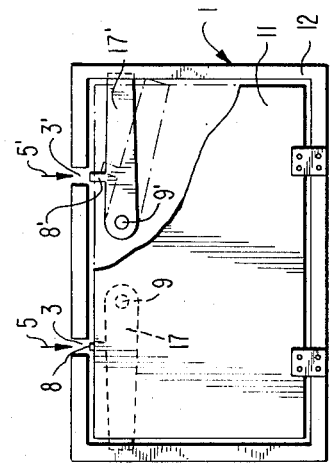
Figure 6:
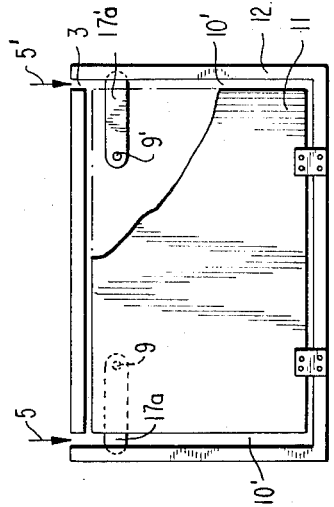

In FIGS. 4 to 6, film cassettes for use with a cover opener according to the invention are illustrated.

In FIG. 4, a pair of engaging members 7 and 7' are mounted on a cover plate 11 at positions in alignment with a pair of notches or holes 3 and 3' formed at the foremost side of body 12 on which the cover plate 11 is mounted via the hinges shown.

The engaging members 7 and 7' have respective springs 71 and 71' by which the members 7 and 7' engage with an appropriate groove or lip in the front side of the body 12 to maintain the cover 11 closed.

By compressing the springs 71 and 71' to disengage the members 7 and 7' from the front side of the body 12, the cover 11 can be opened. The opening of cover 11 can easily be carried out by, for example, a spring between the body and cover which positively biases the cover towards the open position or by charging the cassette to a developing apparatus in such a position that the cover faces downward to permit the film in the casing to drop downward under the influence of gravity upon the opening of the cover 11. In such a case, the projections (schematically shown by arrows 5 and 5') enter notches or holes 3 and 3' and rearwardly force members 7 and 7' against the pressure of springs 71 and 71', respectively, to drop it downwardly. The latter is preferable for dropping out a light sensitive sheet in the cassette with opening of the cover 1.

FIG. 5 represents another cover engaging means in which a pair of swinging levers 17 and 17', each having a releasing projection 8 or 8' and an engaging tip opposite pins 9 and 9' which engages the side of the body 12, are swingably mounted on cover 11 by means of pins 9 and 9'. The releasing projections 8 and 8' are in alignment with notches or holes 3 and 3', so that upon inserting the projections into the notches or holes 3 and 3' (represented schematically by arrows 5 and 5', respectively) the levers 17 and 17' turn in the clockwise and counter clockwise directions, respectively, to release the tips thereof from the respective sides of the cassette body 12, whereby the cover 11 can be opened either by a spring biasing means or by gravity. The members 17 and 17' may, of course, be spring biased towards the lock position.

In the embodiment shown in FIG. 6, spaces 10 and 10' are formed between both sides of a body 12 and opposite edges of a cover 11. The spaces 10 and 10' are in alignement with projections (schematically represented by arrows 5 and 5') mounted on guides, and a pair of swingable levers 17a, 17a' which are rotatably mounted on pins 9 and 9' engage the respective sides of the body 12 through the spaces 10 and 10'. Thus constructed, upon inserting the projections schematically shown by arrows 5 and 5', into the spaces 10 and 10' to contact levers 17a and 17a', respectively, levers 17a, 17a' are turned in the clockwise and counter clockwise directions, respectively, to release the levers from the sides of the casing body 12. This cassette can also be used with cover openers shown in FIGS. 2 and 3 by making the distance between the notch 3 and 3' and the nearest sidemost edge equal to the distance between the projection 5 and 5' and the guides 4 and 4', respectively.

According to the present invention, in preferred embodiments a film cassette has notches or holes into which projections are adapted to be inserted both being an equal distance from both sidemost edges regardless of the size of the film cassette, so that projections on the film cassette guide means can be mounted at the most effective positions, namely near the frontmost edge of the cassette.

It is easily seen that, of course, that only one notch or hole is necessary in combination with one projection on a guide, but for commercial use reliability is increased with two holes or notches, and hence practically speaking film cassettes will be provided with two spaced holes or notches which mate with two projections in the guides. Such a single hole or notch/single projection embodiment is within the invention, of course, though non-preferred. Further, it is not necessary that both holes or notches (and, of course, the corresponding projections) be an equal distance from the sides of the cassette, and varying distances could be used so long as an appropriate alignment with a projection is provided. No practical benefits are obtained by such a feature, however, and as a matter of practice the holes or notches will be an equal distance from the sides of the cassette, with the projections spaced to mate therewith. In a similar manner, more than two notches or holes can be correlated with more than two projections, but this is seldom necessary.

It will further be apparent from the present specification that while the guides are shown as a separate unit, in fact the guides could be mounted or secured to, e.g., developing apparatus, and with the embodiment where the guides are laterally adjustable in size any of a wide numbers of film cassettes with an appropriately disposed notch(es) or hole(s) can be opened merely by adjusting the guide size and sliding the film cassette along the guides until the projections(s) on the guide(s) enter the notch(es) or hole(s) and release the film cassette locking means.

In an embodiment where the cover opener of the present invention is, for example, part of a developing apparatus, it can be seen that the guides would be formed in the sides of the film cassette receiving area and the projections could, for example, be formed as integral or attachable protrusions on the rear wall of the developing apparatus, in which case the developing apparatus would essentially serve the function of acting as a support for the guides and projections. Likewise, in this case the guides could be laterably adjustable while supported by the side walls of the film cassette receiving area, thereby avoiding the necessity for a laterably adjustable connecting member. In such a modification, of course, one has merely taken the cover opener of the present invention and included it in a larger apparatus.

As mentioned above, in accordance with the invention a cover of a film cassette can be easily opened by an opener means simple in construction, regardless of the dimensions of film cassette.

As described above, though the invention has been explained with respect to the particular embodiments, it should be noted that various changes and modifications can be made within the scope of the invention which is limited only by the appended claims.

What is claimed is:

1. A cover opener for use with a film cassette having a cover hingedly overlying the side of the cassette, the improvement wherein:

said cover opener comprises guide means for slidably supporting said cassette for movement longitudinally on said guide means and at right angles to the hinge axis and at least one projection carried by said guide means positioned within the path of movement of said cassette and facing the leading end of said cassette opposite that end to which the cover is hinged, and a notch or hole within the leading end of said cassette in alignment with said projection to permit entrance of a cover opening projection.

2. The cover opener of claim 1 wherein said guide means comprises a pair of guides laterally disposed in face to face relationship.

3. The cover opener of claim 2 where said guides are laterally disposed a distance equal to the lateral width of a film cassette.

4. The cover opener of claim 3 wherein said cover opening projection is disposed between said guides and is adapted to enter said hole or notch at the completion of the film cassette slide upon said guides.

5. A cover opener as claimed in claim 4 wherein said cassette includes a film cover locking means within said cassette in alignment with said hole or notch and wherein said projection is adapted to enter said hole or notch and release said film cassette cover locking means.

6. A cover opener as claimed in claim 3 wherein said cassette includes a film cover locking means within said cassette in alignment with said hole or notch and said cover locking means is released by pushing said cover locking means from a locked to an unlocked position upon contact with said cover opening projection.

7. A cover opener as claimed in claim 6 wherein a projection is integral with a guide, and wherein the distance between the side of a guide and a projection and the side of the film cassette and a notch or hole therein are equal, whereby upon sliding the film cassette along the guides the hole or notch mates with the projection, thereby releasing said cover locking means.

8. A cover opener as claimed in claim 6 wherein a cover opening projection is provided adjacent to each guide, and each projection is spaced an equal distance from the nearest guide, and said projections complement equally the spaced holes or notches within the film cassette.

9. The cover opener of claim 8 wherein said guides are relatively laterally adjustable.

10. A cover opener as claimed in claim 1 wherein: two laterally spaced guide means are adjustable in the lateral direction and adapted to slidably receive substantially rectangular film cassettes of varying sizes which have cover closing means releasable by pushing the cover closing means from a locked position to an unlocked position, each film cassette has two holes or notches in the leading edge thereof to permit projections to engage the cover closing means and push them from the locked to the unlocked position, each hole or notch in the film cassette, no matter what the size of the film cassette, being the same distance from the nearest side of the film cassette; a projection is disposed at one end of each guide means and spaced a distance from the guide means equal to the distance between a corresponding hole or notch in the film cassette, which projection upon sliding the film cassette in the guide means enters the corresponding hole or notch in the film cassette and thereby pushes the cover closing means from the locked position to the unlocked position, whereby no matter how the size of a film cassette varies, a projection will always engage a hole or notch in the film cassette to unlock the same.

* * * * *